Patented Apr. 27, 1948

2,440,604

UNITED STATES PATENT OFFICE 2,440,604

HIGH FAT INGREDIENTS FOR SOUP AND THE LIKE AND METHOD OF PRODUCTION

Chastain G. Harrel and Robert O. Brown, Minneapolis, Minn., assignors to Pillsbury Mills, Inc., Minneapolis, Minn., a corporation of Delaware No Drawing. Application August 20, 1945, Serial No. 611,687

6 Claims. (Cl. 99—83)

1

This invention relates to a prepared food product containing farinaceous ingredients and substantially large quantities of edible oils or fat and to the method of producing the same.

The term "farinaceous" as used herein and in the appended claims, is meant to include, in addition to cereal grains, other natural food products such as soybeans, peas, beans and the like.

It is an object of our invention to provide a method by which such farinaceous, whole or partial grain food materials may be very heavily loaded with fats or oils and the keeping qualities of the product, as well as food mixtures containing the treated ingredients, very greatly improved.

At the present time, various food mixes contain fats or shortening material mixed with and sometimes partially absorbed in flour, kernels and grits and other granular or powdered material, constituting the bulk of the mix. The fats and oils in such mixtures are largely carried by the surfaces of the granules and in the natural rubbing action and contact, which takes place in the blending or mixing as well as in the transportation, handling and standing of the packaged product, become quite widely diffused or distributed and are thus readily acted upon by air, as well as various elements contained in the farinaceous material and other ingredients of the mixture. The keeping quality of such food, is generally poor. In addition, a considerable amount of oil is absorbed by the carton or container, decreasing the contents of the mixture and creating an unclean appearance of the package.

It is a further object of our invention to produce a farinaceous, fat-loaded product wherein the granules or particles are in hollow form and individually contain therewithin, a relatively large amount of shortening material.

Another object is the provision of a simple, inexpensive and commercially practical method for quickly producing such a product.

In carrying out our method, almost any type of farinaceous material (preferably whole grain) may be utilized. The kernels, granules or fragments are exploded or puffed in accordance with any of the well known commercially successful methods. The explosion of the farinaceous particles is carried out to prevent disintegration of the same, leaving the exploded or puffed particles in unitary form, each having an integral casing containing a large number of hollow cells.

In the next step of our method, a quantity of the puffed or exploded particles in comparatively dry state (containing not in excess of 8% moisture by weight), are mixed with the requisite

2 amount of edible fat or oil which has been preheated to put the same in fluid state. In this connection, we prefer to provide a mixing tank or container which is connected with a suitable source of partial vacuum and provided with suitable valve air intakes for quickly subjecting the contents thereof to atmospheric pressure. The tank or container is preferably provided with efficient agitating means adapted when desired, to mix the ingredients therein without substantial disintegration of particles.

In carrying out our method, the requisite amount of fat or oil such as hydrogenated cotton seed oil or any of the other edible oils or fats which are normally in solid form at temperatures below 110° F. may be utilized. This shortening material, either preheated to maintain fluidity or heated after entrance into the tank, is preferably first introduced and maintained at a temperature considerably below boiling within a range of 110° to 240° F. and the exploded particles are then introduced in the container.

The source of partial vacuum is then connected with the tank and the particles are gently mixed with the heated oil or fat, the mixture being accomplished with a minimum of agitation since violent agitation will crush the cells of the particles. Mixing is accomplished in a few minutes time.

Thereafter, the partial vacuum is disconnected from the tank and the tank is quickly subjected to atmospheric pressure. While the pressure within the tank or container is being restored, the mixture is agitated. The materially increased pressure in the tank forces the thin oil or fats into the many cells of the farinaceous particles filling or partially filling these cells in accordance with the proportions of the fat ingredient utilized and the degree of comparative pressure obtained through the previous step of creating a partial vacuum in the container.

The individual, cellular particles are thus loaded or partially loaded, internally with the shortening materials and due to the cellular construction and somewhat glazed exteriors or casings, the absorption of fats and oils is very largely within the cells rather than a surface absorption.

The product is thereafter cooled and the oils and fats harden within the cells of the particles and will not to any appreciable extent thereafter, seep from the particles until the product is heated for use.

Thus the fattening material is protected by the farinaceous shells and the loaded particles rich in fats, may be mixed with other ingredients for prepared foods with the result that the keeping qualities of the products are very materially improved while nevertheless, enabling large proportions of fat ingredients to be carried by the farinaceous particles.

When food products, prepared in accordance with our improved method, are heated for eating purposes as by addition of boiling water or heating beyond the melting point of the contained solid oils and fats, the said oils and fats seep from the particles and diffuse with the entire mixture, thus effecting a quite uniform distribution of the shortening materials.

Our method has been very successfully carried out in the treatment of such farinaceous ingredients as wheat, corn, oats, farina, rice and barley with the various fats and oils extensively used in food products and which are desirable for the human diet to add caloric value. The invention is applicable to very wide general use and has particular application to the preparation of soup ingredients and soup stocks.

In the step of subjecting the mixture of farinaceous, exploded ingredients and fluid fats to partial vacuum, the degree of partial vacuum and its relation to the subsequent atmospheric pressure, is of course, determined upon the characteristics of the cellular particles to be impregnated. In some instances, before mixing the farinaceous particles with the heated oil or fat, the particles are cut after being exploded, making the same of course, more permeable to the oil and here a relatively less partial vacuum is needed than in the case of whole grain exploded particles. We have successfully carried out our method depending upon the particular farinaceous materials used, within quite a wide range of partial vacuum, varying all the way from −½ inch of mercury to −24 inches.

What is claimed is:

1. The method of producing fat-loaded farinaceous particles which consists in first exploding a multiplicity of farinaceous particles to convert the same into integral, cellular bodies, then mixing with a multiplicity of said cellular bodies, a fat ingredient in liquid state, subjecting said mixture to partial vacuum, then subjecting said mixture to a materially increased pressure to cause the liquid fat ingredients to be forced by pressure into the cells of said bodies and thereafter, cooling the particles to congeal the fat within said cells.

2. The method of producing fat-loaded, farinaceous particles which consists in mixing a multiplicity of exploded, cellular farinaceous particles with a quantity of fat ingredient in heated fluid state, having a melting temperature in excess of 100° F., subjecting the mixture to pressure materially in excess of the pressure at which said ingredients were mixed to cause said fat ingredients to be forced into the cells of said particles and thereafter, cooling the particles to congeal the fat in solid state within said cells.

3. The steps in the method of producing fat-loaded farinaceous particles which consists in mixing edible fat ingredients in heated liquid state and having a melting point above 100° F. with a quantity of exploded, cellular farinaceous particles subjecting said mixture to partial vacuum and immediately thereafter, subjecting said mixture to atmospheric pressure to cause said liquid fat ingredients to be forced into the cells of said particles and thereafter, cooling the particles to congeal the fat in solid state within said cells.

4. A farinaceous, fat-loaded product comprising a multiplicity of exploded, cellular farinaceous shells having the cells thereof partially filled with solid, edible fat.

5. A prepared, fat-loaded food product comprising a multiplicity of exploded, integral, cellular farinaceous particles having edible solid fat material encased within the cells thereof.

6. As an article of manufacture, the product called for in claim 5, wherein the fat material has a melting point in excess of 100° F.

CHASTAIN G. HARREL.
ROBERT O. BROWN.

REFERENCES CITED

The following references are of record in the file of this patent:

UNITED STATES PATENTS

| Number | Name | Date |
|---|---|---|
| 1,705,034 | Smith et al. | Mar. 12, 1929 |
| 2,275,565 | Sherwood et al. | Mar. 10, 1942 |
| 2,287,737 | Huzenlaub | June 23, 1942 |